United States Patent Office 3,420,976
Patented Jan. 7, 1969

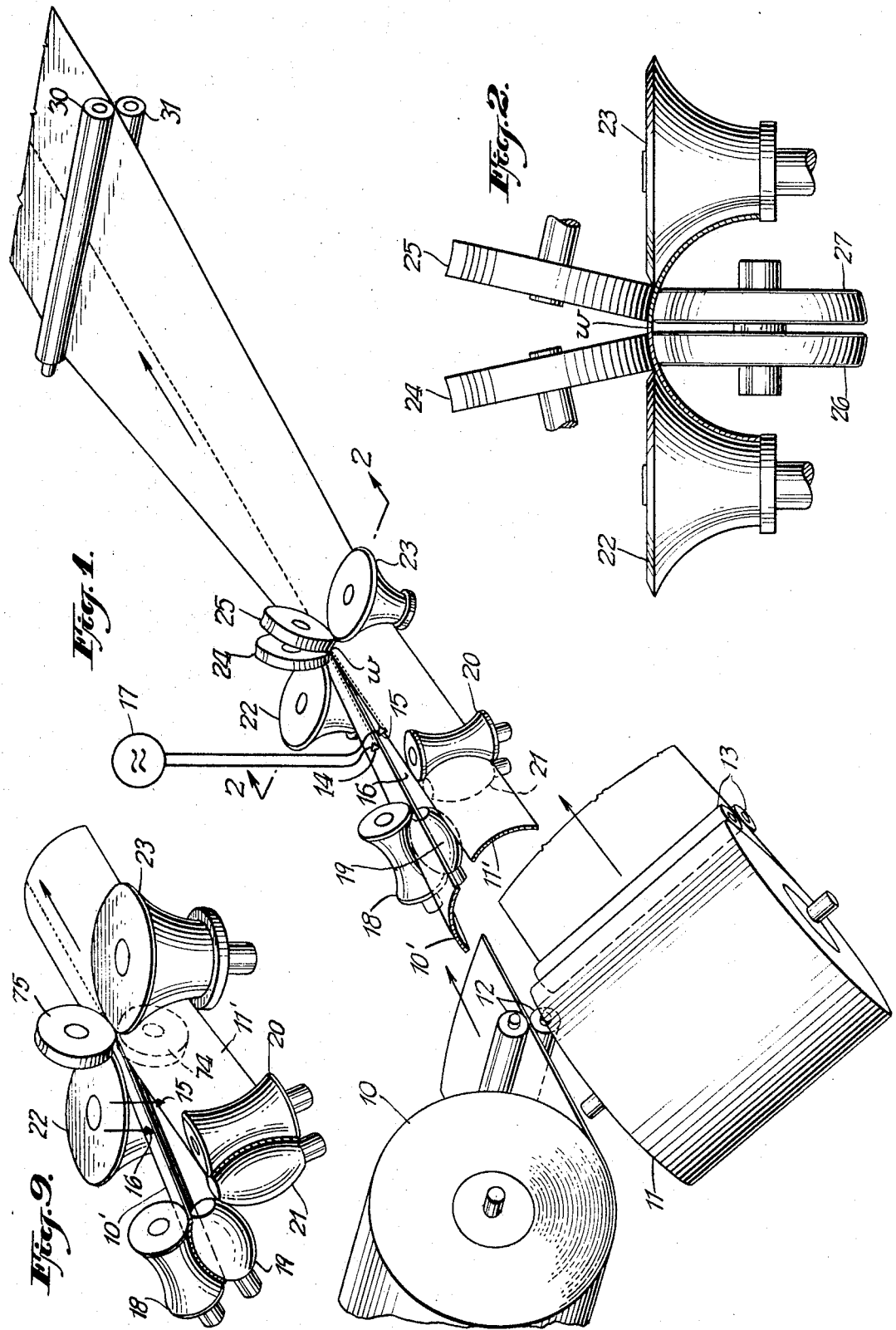

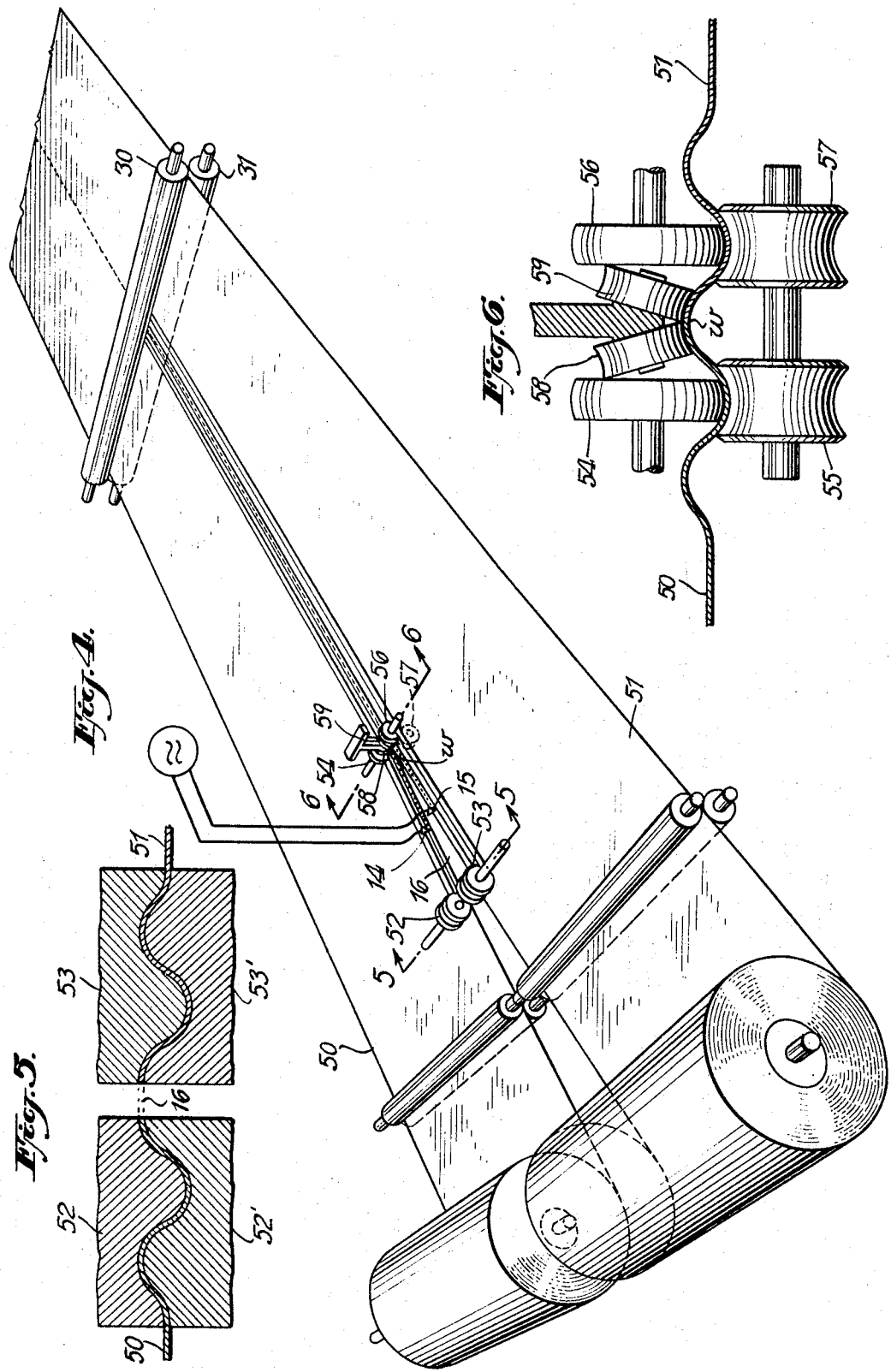

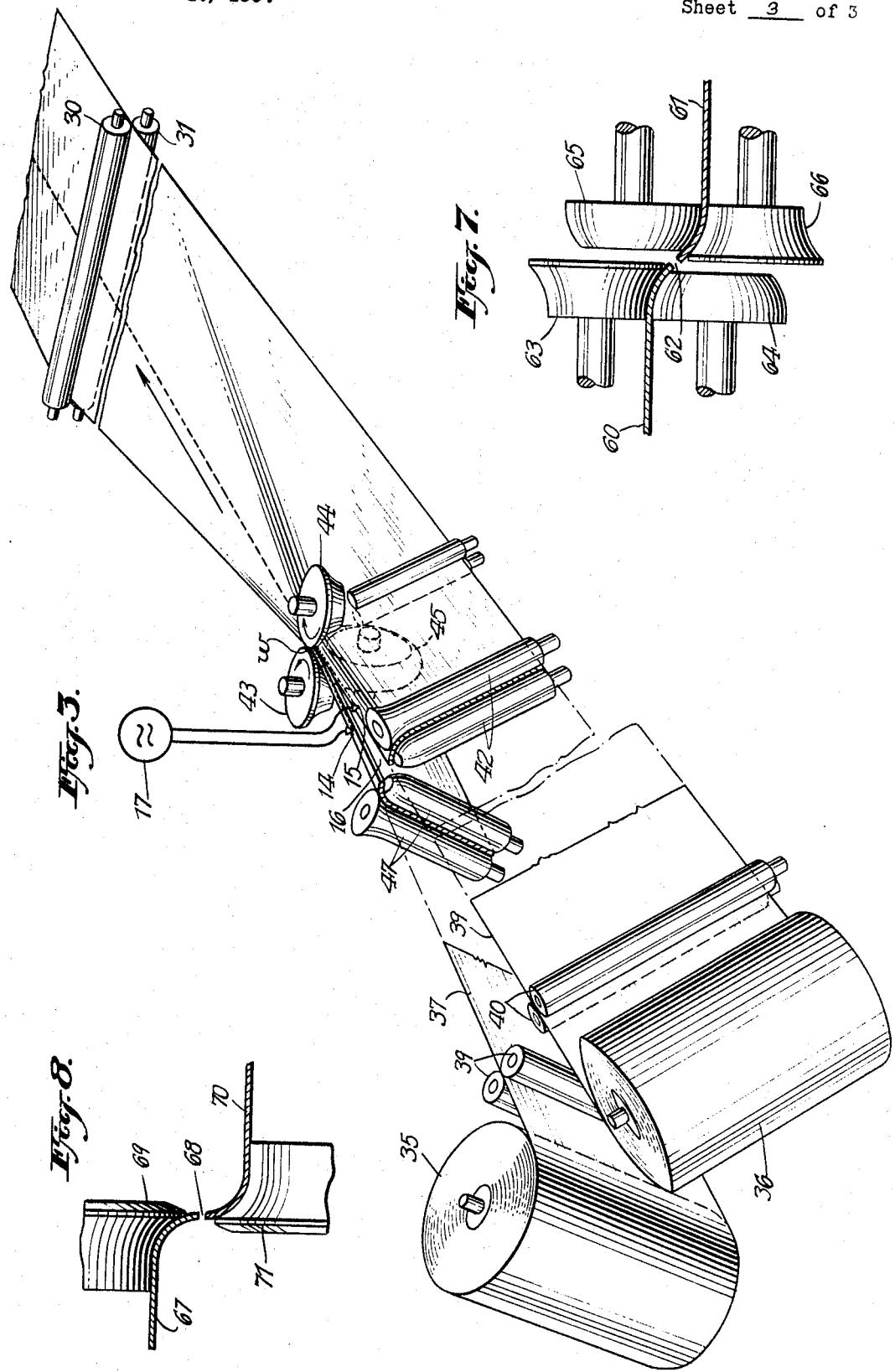

3,420,976
METHODS AND APPARATUS FOR WELDING WIDE METAL STRIPS TOGETHER
Jack Morris, Monsey, Morton Gerald Yuter, Hempstead, Wallace C. Rudd, Larchmont, and Richard J. Allen, Jr., Eastchester, N.Y., assignors to American Machine & Foundry Company, New York, N.Y., a corporation of New Jersey
Filed June 19, 1964, Ser. No. 376,446
U.S. Cl. 219—102    16 Claims
Int. Cl. B23k *11/02*

ABSTRACT OF THE DISCLOSURE

A method and apparatus for welding together two relatively wide elongated sheet metal strips in which the strips are advanced along convering paths forming a V-shaped gap, and high frequency electrical current is applied to the marginal portions in advance of the weld point to heat the facing surfaces to welding temperature. The marginal portions are curved transversely of the general plane of the strip to impart curved cross-sections and thereby having convex curved surfaces adjacent said edge portion. At the weld point the edge portions are forced into contact with each other by restraining the strips against movement in the direction of their widths while pressing against the convex surface of each strip in a direction transverse thereof at the weld point to change the curvature of the marginal portions to bring the edge portions into contact.

---

This invention relates to methods and apparatus for welding together edge-to-edge, pairs of sheet metal portions.

A method of welding together sheet metal portions or strips and the like is now in extensive use in accordance with which the strips are longitudinally advanced with their edges which are to be welded coming together under pressure at a weld point and with a V-shaped gap having its apex at such point while high frequency current is caused to flow along on the opposed edges of such gap in advance of the weld point for heating the edges to welding temperatures at such point.

While this method is highly successful in welding together elongated metal portions of cross-sections such that same may be readily squeezed edgewise together as they are advanced so as to meet at the weld point with such a V-shaped gap in advance of said point, yet if the members to be welded are in the nature of quite wide or relatively thin sheet metal strips with normally generally flat cross-sections, then certain difficulties arise which have heretofore tended seriously to limit the use of this method to the butt welding of relatively narrow strips. That is, it is necessary to bring the strips together firmly under transversely directed pressure as by the use of squeeze rollers at opposite sides of the weld point in order that the strip edges will be brought into good forged welded relation at said point. Yet if the strips are relatively wide, thin and flat in cross-section, same will have to more or less buckle transversely if sufficient pressure is to be applied transversely if sufficient pressure is to be applied transversely to bring the edges together at the apex of the gap. Such wide strips cannot be readily advanced so that their opposed edges will be at an angle to each other along the sides of the V gap in advance of the weld point, and then come together along a straight seam line without causing irregular deflections or wrinkling of the strips and this would result in irregular or non-uniform weld formations, among other possible difficulties. Also while the strips are flat, rollers applied to the surfaces thereof cannot effectively be used to apply the necessary transverse pressure thereto, at least without the danger of irregular slippage.

It is the practice to manufacture and ship relatively wide metal strip furnished in the form of coils, for example, and oftentimes before using this material, it may be desired to weld the edge of the strip of one of such coils to the edge of the strip of another coil thereof, thereby to provide a strip of double width. Such strips as originally supplied may be, for example, some 40 or 50 inches in width and relatively thin, and thus if a pair of such strips are advanced through welding apparatus side by side for edge butt welding, the above-explained problems will arise.

In accordance with the present invention, these problems are overcome by advancing the strips of normally substantially flat cross-sections, while so shaping same prior to the weld point as to impart curved cross-sections thereto of such shapes that, while the surfaces on their edges preferably still will face each other for butt welding, yet portions of the strips extending along near the edges present surfaces which are sufficiently deflected from their normal planes as to be yieldable in directions transversely of the strips and against which latter surfaces pressure may readily be applied, as by rollers, to force the strips into firmly-welded engagement in passing the weld point, and, subsequent to the weld point, the strips are welded together at their edges, are restored to their normally substantially flat cross-sections.

In carrying out the invention, for example, the strips may be caused to become curved, as they advance, from their normal flat condition, to cross-sections which, starting respectively from the edges of the V-shaped gap, curve outwardly and downwardly to present somewhat yieldable side surfaces for the assembly of two strips and against which side surfaces the pressure rollers may readily be applied to press the strip edges together at the weld point, and subsequent to which the two welded-together strips are then passed through rollers or other means for restoring same to their normally substantially flat cross-sectional condition.

According to another alternative aspect of the invention, one of the strips, while being advanced, may be so curved in cross-section that its edge portions are deflected, for example, downwardly, whereas the opposed edge portions on the other strip are curved to have a cross-section extending correspondingly upwardly, and yet so that the surfaces on the edges of the strips will still face each other for coming into butt welding engagement.

According to another example of the invention, originally substantially flat metal portions or strips may have their edge portions so caused to be curved in cross-section that same will be corrugated whereby pressure rollers at the region of the weld point may suitably engage the corrugations as to force the strip edges or metal portions together in welded relation, after which, if desired, the welded-together strips may be advanced between pressure rollers or other means for flattening same to restore their original substantially flat cross-sections, or same may be left corrugated as mentioned below.

The welded seam may be either a butt weld or if preferred a flattened mashed lapped type of weld such as disclosed in British patent specification 881,091, reference to which is hereby made.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of one form of arrangement of apparatus for carrying out the invention;

FIG. 2 is a broken sectional view taken substantially along line 2—2 of FIG. 1;

FIG. 3 is a view similar to FIG. 1 but illustrating an alternative arrangement;

FIG. 4 is another view similar to FIG. 1 but illustrating a further alternative embodiment of the invention;

FIG. 5 is a sectional view taken substantially along line 5—5 of FIG. 4;

FIG. 6 is a sectional view taken substantially along line 6—6 of FIG. 4;

FIGS. 7 and 8 are sectional views similar to that of FIG. 2, but illustrating further alternative embodiments of the invention; and FIG. 9 is a schematic perspective view illustrating the use of the invention in making a mashed, lapped weld.

Referring now to FIG. 1 in further detail, there is shown at 10 and 11 a pair of coils of wide metal strips which are being drawn from such coils, each through the nips of one or more pairs of guide rollers, as at 12, 13. The strips are rapidly advanced past a weld point, indicated at w, by utilizing suitable drive means for operating various of the rollers shown. In advance of the weld point w, a pair of contacts 14, 15 are positioned to engage the strips respectively at opposite sides of a V-shaped gap 16, these contacts being connected to a suitable source of high frequency current 17, which may be of a frequency of about 50,000 cycles per second or preferably much higher and in the range of 300,000 to 450,000 cycles per second, whereby the current will flow from the contacts along opposed edges of the gap 16 to and from the weld point for heating the edge surfaces up to welding temperature as they come together at said point.

Substantially in advance of the weld point, the two strips are caused to assume curved cross-sectional shapes, as indicated at 10′ and 11′, this being accomplished by the use of one or more pairs of pressure rollers having curved surfaces which engage opposite surfaces of each strip. For example, as here shown, the curvature at 10′ is effected by an upper roller 18 and a complementary curved under roller 19, whereas the curvature at 11′ is effected by similar rollers 20 and 21. In this way, the strips are caused to assume cross-sections which, starting at the gap edges, curve outwardly and downwardly therefrom, and whereby the assembly of the two strips will present side surfaces which may be effectively engaged by pressure rollers, as at 22, 23, having suitably curved surfaces to correspond to the curvatures of the strips at regions at opposite sides of the weld point w. That is, at this region the two strips respectively present surfaces somewhat yieldable or resilient transversely for engagement by the rollers 22 and 23, in a manner whereby such rollers are able firmly to press the strip edges together at the weld point to form a good forged type weld. If desired, a pair of additional rollers, as at 24, 25, may be provided to engage the upper surfaces of the strips at opposite sides of the weld point w, as best indicated in FIG. 2. Similarly, on the undersides of the strips adjacent the weld point, suitably mounted rollers, as at 26, 27, may be provided. If preferred, the rollers 24, 25 and 26, 27 may be positioned close enough together to mash the surface of the seam line into flattened condition.

After the strips are welded together and passed beyond the weld point, the welded assembly is further advanced through the nip of pressure rollers as at 30, 31 which either alone or with additional flattening or leveling means, will serve to bring the cross-section of the welded-together strips back to its normal flattened condition, so that, if desired, same may again be rolled into a coil, or otherwise used.

The arrangement of FIG. 3 is similar to that of FIG. 2, except that here two coils 35, 36 of the strip material, are mounted on axes at such angles with respect to each other that the strips 37 and 38 as uncoiled therefrom, will extend along planes at an acute angle to each other through the nips of guide rollers as at 39, 40, 47 and 42. Thereafter, as the strips are being advanced up to the weld point w, the portions along the upper edges thereof are caused to be curved inwardly, so that what were formerly the upper edges thereof, are brought into opposed facing relation so that they become butt welded together at the weld point. These curvatures are imparted by pressure rollers such as at 42, 47, 43 and 44 at opposite sides of the weld point, which have surfaces shaped to correspond with the desired cross-sectional curvatures to be imparted to the strips. If desired, the undersurface of the edges of the strip at the region of the weld point, may be engaged as by pressure roller 45. In some cases, it may be desirable preliminarily to curve the upper strip edges by additional rollers with properly curved surfaces positioned in advance of the contacts 14 and 15.

After leaving the weld point, the welded-together strips of FIG. 3, as in the case of FIG. 1, may be advanced through the nip of flattening rollers as at 30, 31, or through such other or additional flattening means as may be desired.

The embodiment of FIG. 4 is also generally similar to that of FIG. 1, except that here the strips 50, 51, normally of flat cross-section, are fed respectively through the nips of pairs of corrugating rollers as at 52, 52′, and 53, 53′ whereby, as best shown in FIG. 5, portions of the strip at either side of the V-shaped gap 16, will become curved in cross-section outwardly and downwardly and then with corrugations or undulations so that transversely of the strips, same become relatively yieldable or resilient. Yet the surfaces on the edges of the gap will remain facing each other, ready to go into butt-welding engagement at the weld point w. At the opposite sides of the weld point, as best shown in FIG. 6, pairs of rollers, as at 54, 55 and 56, 57, are in position firmly to engage the corrugations along near the opposite sides of the weld point. At the region on the upper surfaces of the strips at the weld point, same may be engaged by angularly-positioned pressure rollers 58 and 59, suitably mounted so that they apply pressure to the meeting gap edges and tend to force same firmly inwardly and downwardly into forged welded relation, while the rollers 54–57 act to prevent any tendencies of the edges to separate under pressure of the rollers 58, 59. As with the previously described embodiments, after the welded-together strips leave the weld point, they may be advanced through flattening means, as at 30, 31, restoring same to their initial flat condition.

It may be here noted that the arrangement as shown in FIG. 6 is well adapted to weld edge-to-edge relatively wide strips or metal portions of initially corrugated sheet material which it may be desired for various uses to retain in corrugated form after welding the edges together.

FIG. 7 illustrates an embodiment wherein the edges of two strips 60, 61 are caused in advance of the weld point to be curved in cross-section along adjacent the gap therebetween at 62, and for example, so that the strip 60 becomes curved downwardly as by passing through the nip of rollers 63, 64, having suitably curved complementary surfaces, whereas strip 61, along its edge portions, is caused to assume an upwardly curved cross-section by passing through the nip of suitably complementarily curved rollers 65 and 66.

The embodiment of FIG. 8 is similar to that of FIG. 7, except that here the edge portions of a strip 67 are caused to assume curved cross-sections so that at the gap 68, the edge will extend down vertically, this curvature being secured as by the use of a suitably-shaped roller 69. On the other hand, the opposed strip 70 may be caused to assume a transverse curvature directed vertically upwardly at the gap 68, this curvature being caused by the use of a roller, such as indicated at 71. If desired, rollers such as indicated in FIG. 7 may be positioned to apply curvatures to the strips first as shown in that figure, with the strips then advancing to rollers such as shown in FIG. 8 positioned at or just prior to the weld point.

The embodiment of the invention illustrated in FIG. 9 is similar to the one shown in FIG. 1 and corresponding parts are identified with the same reference numerals. When a mashed, lapped weld seam between relatively wide sheets is being produced rather than a butt weld, similar problems arise in that the edge portions of the sheets must be held apart prior to the weld point and must be forced into overlapping relation just in advance of the weld point. This is particularly true if the edge portions are held at the same level prior to being forced into overlapping relation.

In FIG. 9, the two strips 10' and 11' are caused to assume curved cross-sectional shapes by the rollers 18–21 and the edge portions thereof are then forced into overlapping relation by the rollers 22 and 23. By the time the edge portions reach the opposed rollers 74 and 75, they are at welding temperature and they are squeezed or mashed together by the rollers 74 and 75, preferably to form a weld seam substantially the same in thickness as the thickness of the strips being joined.

Because of the manner in which the electrical heating currents are supplied to the edge portions and the frequency of such currents, the currents, and hence the heating, are concentrated at the surfaces of the edge portions which are nearest to each other. Therefore, if a butt weld seam is to be formed which is the thickness of the strips being joined, the curvature of the strips in advance of the weld point is such that all points on the facing surfaces of the edges in the thickness direction are substantially equidistant. Thus, as viewed in cross-section in FIGS. 2 and 5–8, the edge surfaces, in the plane of the cross-section, are substantially parallel to each other.

Similarly, with lap welding, as illlustrated in FIG. 9, the opposed, overlapped surfaces to be welded together are substantially parallel to each other in the plane of a cross-section shortly in advance of the weld point. Of course, since in both types of welding the edge portions are converging, the edge surfaces are not parallel in the direction of movement of the strips. Therefore, as used herein and in the claims, the expression "facing edge surfaces" shall mean surfaces of the type shown in the drawings, either extending in the thickness direction of the strips or away from the edges in the width direction of the strips, and which are substantially parallel in the plane of a cross-section taken perpendicular to the direction of movement of the strips. Preferably, such surfaces have a dimension in said plane at least equal to the thickness of a strip. It will also be understood that the terms such as "downwardly" or "upward" as used herein and in the claims are intended to be merely relative, since the whole apparatus arrangements as shown may be oriented in various positions.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together at their edges a pair of wide sheet metal strips having normally substantially flat cross-sections and in which method the strips are rapidly advanced longitudinally with their edges which are to be welded coming together under pressure at a weld point and with a V-shaped gap therebetween having its apex at such point, while causing high frequency current having a frequency of at least about 50,000 cycles per second to flow along on the opposed edges of said gap for a substantial distance in advance of the weld point for heating the edges to welding temperature at said point, the improvement which comprises: first advancing said strips along planes which are at a substantial angle to each other and in positions such that said edges which are to be welded together are inclined toward each other while advancing in spaced-apart relation; imparting curved cross-sections to the portions along such edges and thereby imparting convex curved surfaces adjacent said edges, whereby the surfaces on said edges come into opposed facing relationship at opposite sides of said gap and as same approach the weld point; restraining said strips against movement in the direction of their widths while applying pressure against said convex surface of each strip in a direction transverse thereof at said weld point for bending said marginal portions to bring the edges into welded engagement as same pass said point; and, subsequent to the weld point, subjecting the surfaces of the welded-together strips to pressure to cause same to assume a substantially flat cross-section.

2. Apparatus for welding together the marginal edge portions of a pair of wide sheet metal strips, such apparatus comprising in combination means for rapidly advancing the strips longitudinally towards a weld point so that their marginal edge portions flank opposite sides of a V-shaped gap having its apex at the weld point, a pair of electrical contacts engaging said marginal portions respectively in advance of the weld point and connected to a source of heating current of a frequency of at least about 50,000 cycles per second or higher to cause currents to flow to and from the weld point along opposite sides of the gap to heat the facing surfaces to welding temperatures by the time they reach the weld point; rollers having curved surfaces engaging and shaping said strips as same advance prior to the weld point to impart curved cross-sections thereto, such that their edge faces lie in substantially parallel planes and still face each other, while said marginal edge portions of the strips present convex curved surfaces adjacent said edge portions; roller means engaging the convex curved surfaces for restraining said strips against movement in the direction of their widths while applying pressure against said convex surface of each strip in a direction transverse thereof at said weld point and permitting the curvature of said marginal portions to change while under pressure to the extent required to bring said edge portions into contact.

3. Apparatus in accordance with the foregoing claim 2 and in which said rollers which have curved surfaces are so shaped as to impart corrugations on the strips and extending along near their edges which are to be welded.

4. Apparatus in accordance with the foregoing claim 2 and in which the said rollers which have curved surfaces are so shaped and positioned as to impart a downwardly curved cross-section to portions along the edge of one of the strips and an upwardly curved cross-section to portions along the edge of the other strip, and with the surfaces on the strip edges then facing each other as same approach and reach the weld point.

5. Apparatus in accordance with the foregoing claim 2 and in which the said roller means comprises a roller for engaging each of said convex surfaces of the marginal edge portions.

6. Apparatus in accordance with the foregoing claim 2 and in which said roller means comprises a roller for engaging each of said convex surfaces for bringing said edge portions into overlapping contact with each other, and wherein said roller means further comprises a pair of rollers for mashing said overlapped edge portions together at the weld point.

7. A method of forming a double width strip by welding together the longer marginal edge portions of two relatively wide elongated sheet metal strips, said method comprising: continuously advancing the marginal edge portions of two strips along convergent paths so that their facing edge surfaces form opposite sides, respectively, of a V-shaped gap having its apex at a weld point, applying electrical heating currents of a frequency of at least about 50,000 cycles per second or higher to the marginal portions in advance of the weld point so that such currents flow to and from the weld point along opposite sides of the gap to heat the facing surfaces to welding temperature by the time they reach the weld point, and forcing the facing edge surfaces together at the weld point to form a weld therebetween; in which method the marginal portion of each strip is curved transversely of the general plane of the strip in advance of the weld point to impart curved cross-sections thereto, which cross-sections are so shaped that the said facing edge surfaces which are to be welded will still face each other while said marginal portions present surfaces which are yieldable in directions transversely of the strips, applying pressure against said last named surface by roller means to depress said marginal portions at said weld point in a direction transversely of the strips a distance sufficient to bring said facing edge surfaces into welding engagement with each other.

8. A method according to claim 7 wherein said sheet metal strips normally have substantially flat cross-sections, and wherein said marginal portions of said strips prior to the weld point are curved outwardly and downwardly with respect to the edge surfaces, respectively, and wherein subsequent to the weld point the strips are restored to their normally substantially flat cross-sections.

9. Method for forming a welded seam between the edges of sheet metal portions which have curved cross-sections, and hence convex curved surfaces, adjacent said edges, which method comprises: advancing said portions longitudinally and bringing the edge portions into contact with each other at a weld point but maintaining a gap therebetween in advance of said point; causing an electrical heating current having a frequency of at least about 50,000 cycles per second to flow along said edges on the opposite sides of said gap from points a substantial distance in advance of said weld point to and from said weld point for heating the edges up to welding temperature upon reaching said weld point; maintaining the faces of said edges in substantially parallel planes, and hence facing each other, as they are moved from said points a substantial distance in advance of said weld point to said weld point; and pressing against said metal portions adjacent said edges and said weld point in a direction transverse to said convex curved surfaces to deflect the edge faces toward each other and to bring the edge portions into engagement under pressure at the weld point while restraining the sheet metal portions against movement in the direction of their widths.

10. Method according to claim 9 wherein said curved cross-sections are parts of corrugations extending longitudinally of said sheet metal portions and the convex surfaces thereof are pressed downwardly to bring said edge faces into contact under pressure.

11. Method according to claim 10 further comprising shaping said sheet metal portions as they are advanced toward the weld point to impart said longitudinal corrugations thereto.

12. Method according to claim 11 wherein each of said sheet metal portions is formed adjacent an edge of each of a pair of sheet metal strips of substantial width and having normally substantially flat cross-sections and further comprising, subsequent to the weld point, restoring said strips as welded together to their normal, substantially flat cross-sections.

13. Method according to claim 9 wherein each of said sheet metal portions is adjacent an edge of each of a pair of elongated metal strips, the pressing is against said convex surfaces and the curvature of said portions is permitted to change while under pressure to the extent required to bring the edge portions into contact.

14. Method according to claim 13 wherein said edge faces are pressed into contact under pressure.

15. Method according to claim 13 wherein said edge portions are pressed into overlapping contact under pressure.

16. Apparatus in accordance with claim 3 wherein said roller means comprises restraining rollers at opposite sides of the region of the weld point having surfaces shaped to engage corrugations respectively along opposite sides of the weld point but spaced sufficiently at the sides thereof whereby one corrugation will occur along therebetween and will be partially formed of a portion extending along the edge of one said strip and partially formed of a portion extending along the edge of the other said strip and a pair of pressure rolls positioned to apply pressure respectively to said partial corrugation portions to press against same, whereby their edge faces are forced into welded engagement at the weld point, while said restraining rollers, by reason of their engagement in corrugations, retain the strips against relative separation at the region of the weld point.

References Cited

UNITED STATES PATENTS

| 3,132,234 | 5/1964 | Wögerbauer | 219—59 X |
| 3,171,942 | 3/1965 | Kohler | 219—59 |
| 2,062,875 | 12/1936 | Gardner | 219—102 |
| 2,950,376 | 8/1960 | Wögerbauer | 219—59 |
| 3,265,277 | 8/1966 | Bacroix | 219—102 |

RICHARD M. WOOD, *Primary Examiner.*

J. G. SMITH, *Assistant Examiner.*

U.S. Cl. X.R.

219—59, 67